(12) United States Patent
Kim et al.

(10) Patent No.: US 9,304,638 B2
(45) Date of Patent: Apr. 5, 2016

(54) DISPLAY DEVICE WITH A TOUCH PANEL FOR DETERMINING A NORMAL TOUCH AND DRIVING METHOD THEREOF

(71) Applicant: LG DISPLAY CO., LTD., Seoul (KR)

(72) Inventors: Sun Young Kim, Paju-si (KR); Jong Hee Hwang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 71 days.

(21) Appl. No.: 14/078,273

(22) Filed: Nov. 12, 2013

(65) Prior Publication Data

US 2014/0176464 A1 Jun. 26, 2014

(30) Foreign Application Priority Data

Dec. 21, 2012 (KR) .................. 10-2012-0150817

(51) Int. Cl.
*G06F 3/041* (2006.01)
*G06F 3/044* (2006.01)

(52) U.S. Cl.
CPC .............. *G06F 3/044* (2013.01); *G06F 3/0418* (2013.01)

(58) Field of Classification Search
CPC ............ G09G 5/00; G09G 5/08; G06F 3/033; G06F 3/02; G06F 3/041; G06F 3/045; G06F 3/042

USPC .......................................... 345/156, 173–178
See application file for complete search history.

(56) References Cited

U.S. PATENT DOCUMENTS

| | | | |
|---|---|---|---|
| 8,089,470 B1 * | 1/2012 | Schediwy et al. ............. | 345/173 |
| 2005/0017957 A1 * | 1/2005 | Yi ................... | 345/173 |
| 2009/0174679 A1 * | 7/2009 | Westerman .................... | 345/173 |
| 2009/0273579 A1 * | 11/2009 | Zachut et al. .................. | 345/174 |
| 2010/0212974 A1 * | 8/2010 | Kim .......................... | 178/18.03 |
| 2012/0249442 A1 * | 10/2012 | Chang et al. .................. | 345/173 |
| 2012/0313861 A1 * | 12/2012 | Sumi et al. ..................... | 345/173 |
| 2013/0093692 A1 * | 4/2013 | Wang et al. .................... | 345/173 |

* cited by examiner

*Primary Examiner* — Pegeman Karimi (74) *Attorney, Agent, or Firm* — Birch, Stewart, Kolasch & Birch, LLP (57) ABSTRACT

Discussed is a display device and a driving method thereof. The driving method includes respectively receiving a plurality of sensing signals from a plurality of touch electrodes formed at a touch panel, determining whether there is a normal touch, by using a size of a touch region defined by the received sensing signals, and when it is determined that there is the normal touch, performing an operation of extracting touch coordinates of the touch region, or when it is determined that there is an abnormal touch, performing an operation of receiving the sensing signals without performing the operation of extracting the touch coordinates.

7 Claims, 6 Drawing Sheets

FIG. 1

[ Related Art ]

< Before Touch >      < After Touch >

| 102 | 320 | 330 | 324 | 150 |
|-----|-----|-----|-----|-----|
| 102 | 349 | 342 | 527 | 150 |
| 102 | 100 | 150 | 180 | 102 |
| 102 | 100 | 150 | 180 | 102 |
| 102 | 100 | 150 | 180 | 102 |

(a)

| 0 | 1 | 1 | 1 | 0 |
|---|---|---|---|---|
| 0 | 1 | 1 | 1 | 0 |
| 0 | 0 | 0 | 0 | 0 |
| 0 | 0 | 0 | 0 | 0 |
| 0 | 0 | 0 | 0 | 0 |

(b)

| 0 | | | | 0 |
|---|---|---|---|---|
| 0 | \multicolumn{3}{c}{3×2=6} | 0 |
| 0 | 0 | 0 | 0 | 0 |
| 0 | 0 | 0 | 0 | 0 |
| 0 | 0 | 0 | 0 | 0 |

DISPLAY DEVICE WITH A TOUCH PANEL FOR DETERMINING A NORMAL TOUCH AND DRIVING METHOD THEREOF

CROSS-REFERENCE TO RELATED APPLICATIONS

This application claims the benefit of the Korean Patent Application No. 10-2012-0150817 filed on Dec. 21, 2012, which is hereby incorporated by reference as if fully set forth herein.

BACKGROUND

1. Field of the Invention

The present invention relates to a display device, and more particularly, to a display device with a touch panel provided therein and a driving method thereof.

2. Discussion of the Related Art

Touch panels are a type of input device that is included in display devices such as liquid crystal display (LCD) devices, field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

Touch panels are configured as various types depending on a disposed position in a display device.

First, a touch panel may be configured as an on-cell type in which the touch panel is adhered to an upper end surface of a display panel.

Second, a touch panel may be configured as an in-cell type in which two electrodes configuring the touch panel are formed on the same layer of a thin film transistor (TFT) substrate configuring an LCD device.

Third, a touch panel may be configured as a hybrid type in which one of two electrodes configuring the touch panel is formed at a TFT substrate configuring an LCD device, and the other is formed at an upper end surface of a color filter substrate.

The in-cell type touch panel and the hybrid type touch panel may be applied to LCD devices, but an on-cell type touch panel may be adhered to an upper end surface of a display panel configuring a display device irrespective of a kind of the display device.

Figure 1:
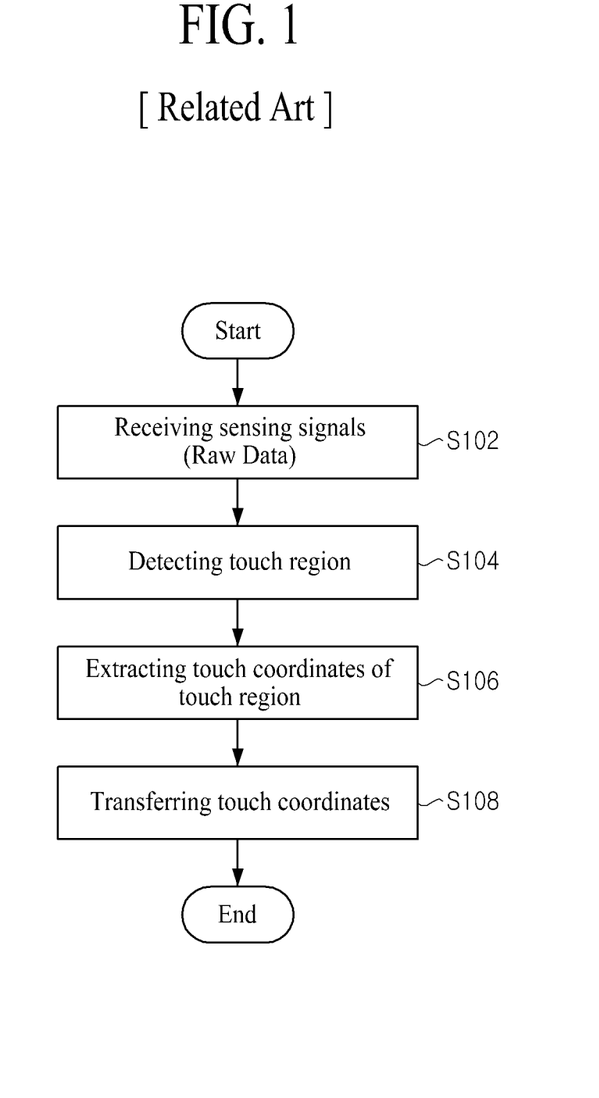
FIG. 1 is a flowchart illustrating a method in which a related art display device with a touch panel provided therein senses a touch.

FIG. 1 is a flowchart illustrating a method in which a related art display device with a touch panel provided therein senses a touch.

The method in which the related art display device with the touch panel provided therein senses a touch, as illustrated in FIG. 1, includes operation S102 in which a touch integrated circuit (IC) receives a sensing signal (raw data) from the touch panel, operation S104 that detects a touch region by using the sensing signal (raw data), operation S106 that extracts touch coordinates of the touch region, and operation S108 that transfers the extracted touch coordinates to a touch use unit which performs various functions by using the touch coordinates of the touch region.

When a plurality of sensing signals are respectively received from a plurality of touch electrodes formed in the touch panel, the related art display device successively performs operations S102 to S108 on all of the plurality of sensing signals.

That is, even when it is determined as the detected result in operation S104 that a touch is performed in a broad region in which it is unable to determine whether a specific menu is selected or a specific control signal is indicated, since the sensing signal is received through operation S102, the touch IC performs operation S106 of extracting the touch coordinates of the touch region by using the sensing signal and operation S108 of transferring the touch coordinates.

For example, when a user uses a display device (which has a greater size than palms like a tablet personal computer (PC)) disposed on a desk, a portion of the user's palm or a lower portion of a fisted hand may touch a touch panel. In this case, a broader region than a region touched by a finger or a pen may be detected as a touch region in operation S104.

An effective touch may be performed in the above-described broad region. However, even when the broad region is detected as the touch region, the related art display device performs operation S106 of extracting the touch coordinates of the touch region, and transfers the extracted touch coordinates to the touch use unit.

Moreover, even when any touch region is not sensed, the related art display device sequentially performs operation S106 of extracting the touch coordinates and operation S108 of transferring the touch coordinates. In this case, the touch coordinates are not extracted in operation S106, and information about there being no touch coordinates is transferred to the touch use unit in operation S108.

That is, even when a sensing signal incapable of being determined as a normal touch is received or a sensing signal with no touch is received, the related art display device sequentially performs a series of processes that determine a touch region in operation S104, extract touch coordinates in operation S106, and transfer the touch coordinates in operation S108.

However, operation S106 of extracting touch coordinates of a broader touch region than a normal touch region or operation S106 of extracting touch coordinates when there is no touch becomes an unnecessary operation. Due to the unnecessary operation, a processing speed of the touch IC can be reduced, and the touch IC can cause a malfunction.

Moreover, as described above, when touch coordinates of a broad touch region are detected as normal touch coordinates, the touch use unit can cause a malfunction.

SUMMARY

Accordingly, the present invention is directed to provide a display device and a driving method thereof that substantially obviate one or more problems due to limitations and disadvantages of the related art.

An aspect of the present invention is directed to provide a display device and a driving method thereof, which analyze a plurality of sensing signals received from a touch panel to determine whether a current touch is a normal touch, and when the current touch is an abnormal touch, do not perform an operation of extracting touch coordinates.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a method of driving a display device including: respectively receiving a plurality of sensing signals from a plurality of touch electrodes formed at a touch panel; determining whether there is a normal touch, by using a size of a touch region defined by the received sensing signals; and when it is determined that there is the normal touch, performing an operation of extracting touch coordinates of the touch region, and when it is determined that there is an abnormal touch, performing an operation of receiving the sensing signals without performing the operation of extracting the touch coordinates.

In another aspect of the present invention, there is provided a display device including: a panel in which a plurality of pixels are respectively formed in a plurality of areas defined by intersections between a plurality of gate lines and a plurality of data lines; a touch panel in which a plurality of touch electrodes are formed; a driver configured to drive the panel; and a touch IC configured to analyze the sensing signals received from the touch panel to determine whether there is a normal touch, and when it is determined that there is the normal touch, perform an operation of extracting touch coordinates of a touch region defined by the sensing signals, or when it is determined that there is an abnormal touch, perform an operation of receiving the sensing signals without performing the operation of extracting the touch coordinates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 2:
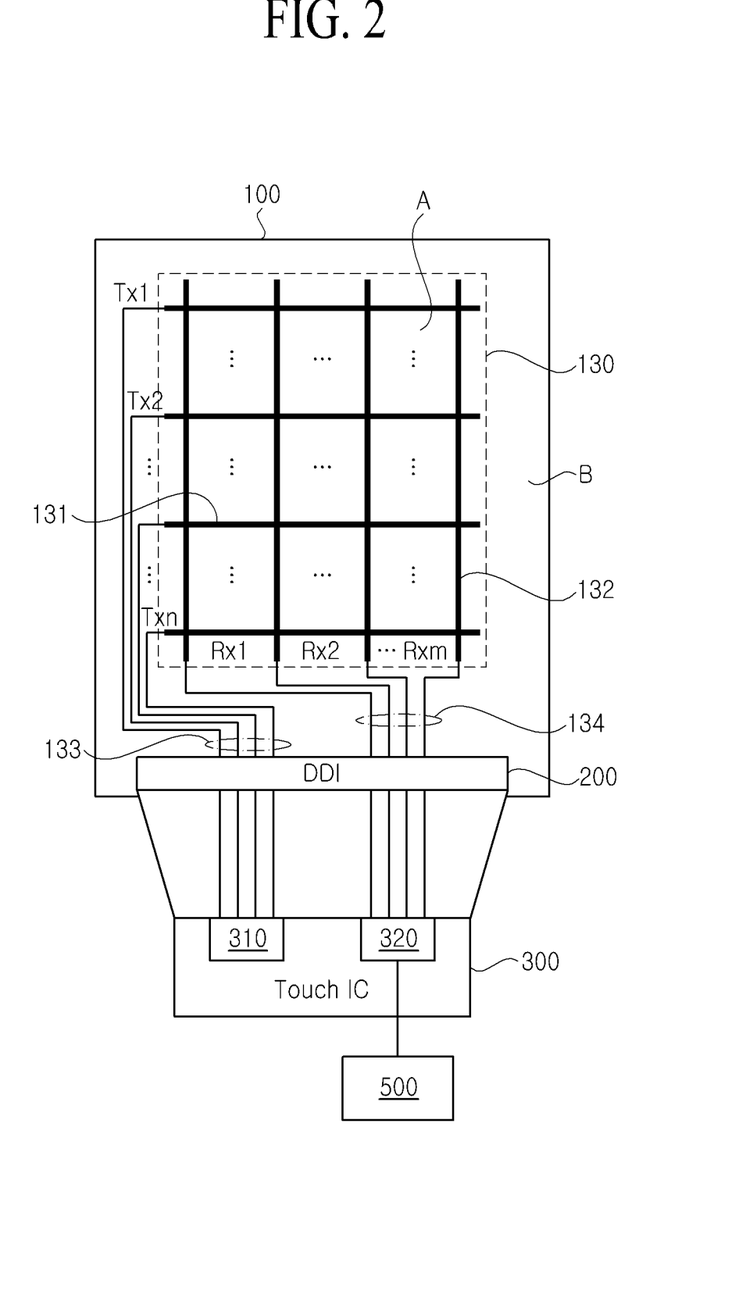
FIGS. 2 and 3 are exemplary diagrams illustrating a display device according to an embodiment of the present invention.
Figure 3:
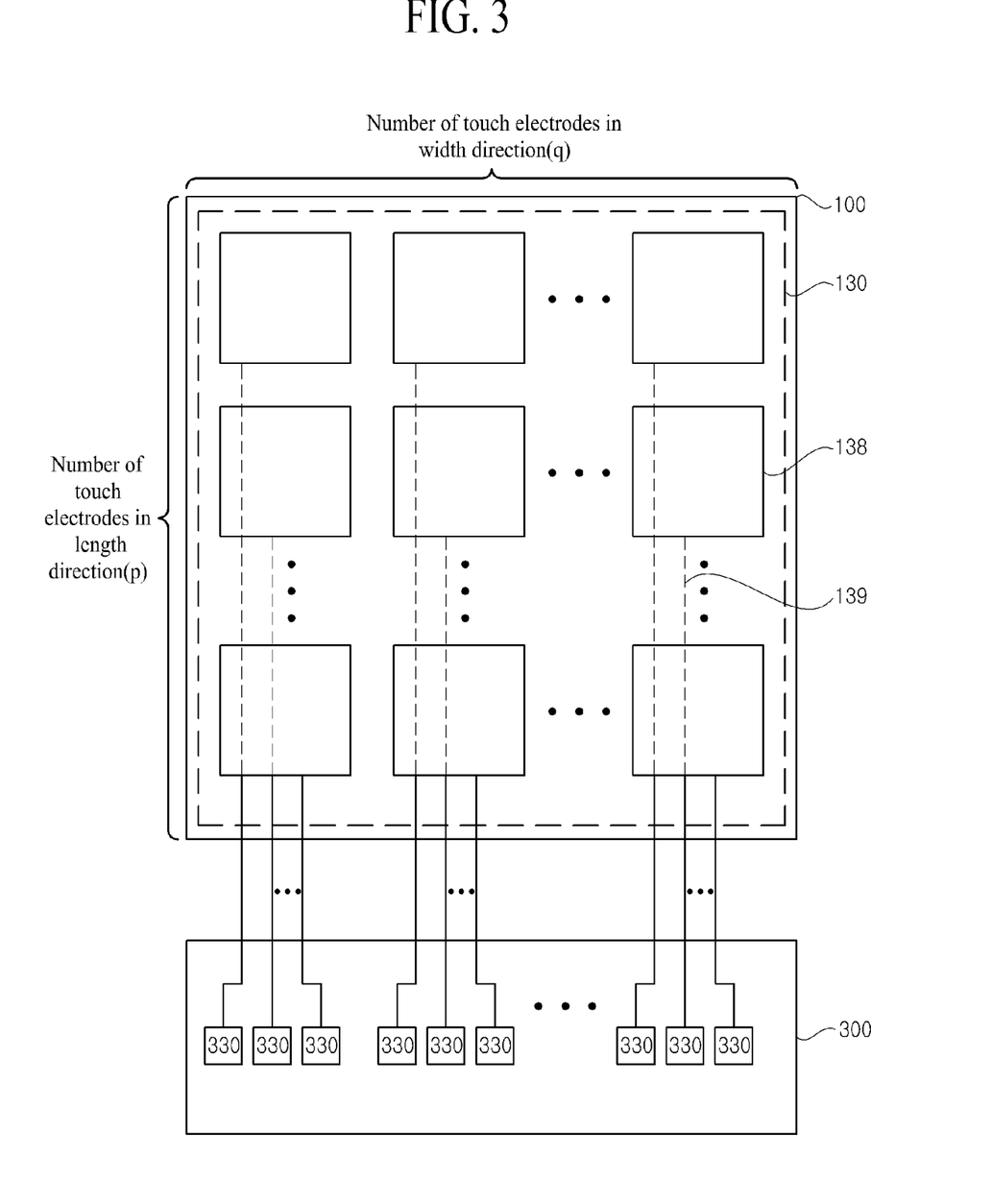

FIGS. 2 and 3 are exemplary diagrams illustrating a display device according to an embodiment of the present invention. FIG. 2 illustrates a display device in which a touch panel using a mutual capacitance is provided, and FIG. 3 illustrates a display device in which a touch panel using a self-capacitance is provided.

The display device according to the present invention, as illustrated in FIG. 2, may include a panel 100 in which a plurality of pixels are respectively formed in a plurality of areas defined by intersections between a plurality of gate lines and a plurality of data lines, a touch panel 130 in which a plurality of driving electrodes 131 and a plurality of receiving electrodes 132 are formed, a driver 200 that drives the panel 100, and a touch IC 300 that drives the touch panel 130.

When the panel 100 is a liquid crystal panel, the plurality of data lines, the plurality of gate lines intersecting the plurality of data lines, a plurality of TFTs respectively formed in the plurality of areas defined by intersections between the plurality of gate lines and the plurality of data lines, a plurality of pixel electrodes for charging data voltages into the respective pixels, and a common electrode that drives liquid crystal charged into a liquid crystal layer along with the plurality of pixel electrodes are formed at a lower substrate (a thin film transistor (TFT) substrate) of the panel 100, and the plurality of pixels are arranged as a matrix type due to an intersection structure of the plurality of data lines and the plurality of gate lines.

A plurality of black matrixes (BM) and a plurality of color filters (CF) are formed at an upper substrate (a CF substrate). A plurality of polarizers (POL1) and (POL2) are respectively adhered to the upper glass substrate and lower glass substrate of the panel 100, and an alignment layer for setting a pre-tilt angle is formed at an inner surface contacting the liquid crystal. A column spacer (CS) for maintaining a cell gap may be formed between the upper glass substrate and lower glass substrate of the panel 100.

The panel 100 is divided into an active area A that displays an image and an inactive area B (i.e., a bezel) that is formed outside the active area and cannot display an image.

The panel 100 may be implemented as various kinds of panels in addition to the liquid crystal panel. That is, the panel 100 may be implemented as an organic light emitting display panel or an electrophoretic display panel.

The touch panel 130 is a capacitive type touch panel using a mutual type, and determines whether there is a user's touch. That is, a capacitive type is divided into a self-capacitive type and a mutual type. The touch panel 130 of FIG. 2 uses the mutual type.

The capacitive type touch panel 130 using the mutual type includes the driving electrodes 131 and the receiving electrodes 132, which are formed in the active area A, and a plurality of driving electrode lines 133 and a plurality of receiving electrode lines 134 which are formed in the inactive area B.

The driving electrode lines 133 are formed in the inactive area B, for connecting the plurality of driving electrodes 131 to the touch IC 300, and the receiving electrode lines 134 are formed in the inactive area B, for connecting the plurality of receiving electrodes 132 to the touch IC 300.

The touch panel 130 may be configured as an on-cell type in which the touch panel 130 is adhered to an upper end surface of the panel 100, or the touch panel 130 may be configured as an in-cell type in which the driving electrodes 131 and the receiving electrodes 132 configuring the touch panel 130 are formed on the same layer of the TFT substrate configuring the panel 100. Alternatively, the touch panel 130 may be configured as a hybrid type in which one electrodes of the driving electrodes 131 and the receiving electrodes 132 configuring the touch panel 130 is formed at the TFT substrate configuring the panel 100, and the other electrodes are formed at an upper end surface of the color filter substrate.

That is, the touch panel 130 applied to the display device according to the present invention may be configured as various kinds and types, and may be provided as the various kinds and types at the panel 100.

In the following description, a generic name for the driving electrodes 131 and the receiving electrodes 132 is called a touch electrode. That is, the touch panel 130 may be configured with a plurality of touch electrodes, which may be divided into the driving electrodes 131 and the receiving electrodes 132.

The driver 200 is for driving the panel 100, and includes: a gate driver that supplies a scan pulse to the plurality of gate lines formed at the panel 100; a data driver that respectively supplies data voltages to the plurality of data lines formed at the panel 100; and a timing controller that controls a function of the gate driver and a function of the data driver.

Here, as illustrated in FIG. 2, the gate driver, the data driver, and the timing controller that configure the driver 200 may be integrated into one chip (DDI), but may be separately provided. As an example, the data driver and the timing controller may be integrated into the chip (DDI), and the gate driver may be configured as a type (a gate-in panel (GIP) type) in which the gate driver is formed at the panel 100.

That is, the driver 200 may be configured as various types.

Finally, the touch IC 300 applies a driving pulse to the driving electrodes 131, and determines whether the touch panel 130 is touched, by using a plurality of sensing signals which are received through the receiving electrodes 132.

The touch IC 300 may be connected to the driving electrode lines 133 and the receiving electrode lines 134 through the driver 200, or may be connected directly to the driving electrode lines 133 and the receiving electrode lines 134.

The touch IC 300 may analyze the sensing signals received from the touch panel 130 to determine whether there is a normal touch. When there is the normal touch, the touch IC 300 may analyze touch coordinates of a touch region defined by the sensing signals, and transfer the touch coordinates to a touch use unit 500. When there is an abnormal touch, the touch IC 300 performs an operation of receiving the sensing signals without performing an operation of analyzing touch coordinates. A function of the touch IC 300 may be performed, particularly, in a receiver 320.

Here, the touch use unit 500 may be a controller of an electronic device that includes the display device according to the present invention.

For example, when the display device according to the present invention is applied to a tablet PC, the touch use unit 500 may be a controller of the tablet PC. Also, when the display device according to the present invention is applied to a smartphone, the touch use unit 500 may be a controller of the smartphone. Also, when the touch coordinates are used in the display device according to the present invention, the touch use unit 500 may be the timing controller.

The display device according to the present invention, as illustrated in FIG. 3, may include: a panel 100 in which a plurality of pixels are respectively formed in a plurality of areas defined by intersections between a plurality of gate lines and a plurality of data lines; a self-capacitive type touch panel 130 that are configured with a plurality of touch electrodes 138 and a plurality of touch electrode lines 139 respectively connected to the plurality of touch electrodes 138; a driver (not shown) that drives the panel 100; and a touch IC 300 that drives the touch panel 130.

Except that the display device of FIG. 3 includes the touch panel 130 having a structure different from the touch panel 130 of the display device of FIG. 2 and the touch IC 300 having a structure different from the touch IC 300 of the display device of FIG. 2, the display device of FIG. 3 includes the same configuration and function as those of the display device of FIG. 2. Thus, hereinafter, only the touch panel 130 and the touch IC 300 will be briefly described.

As described above, the capacitive type may be divided into the self-capacitive type and the mutual type. The touch panel 130 of FIG. 3 uses the self-capacitive type.

The touch panel 130 includes a plurality of touch electrodes 138 and a plurality of touch electrode lines 139. The plurality of touch electrodes 138 are all configured in the same type and structure, and are connected to the touch IC 300 through the respective touch electrode lines 139.

The touch IC 300 simultaneously supplies a touch voltage to the touch electrodes 138, and determines whether there is a touch, by using a period in which the touch voltage is reduced to a predetermined reference voltage.

To this end, the touch IC 300 includes a plurality of sensors 330 that count the reduction period after the touch voltage is supplied to the touch electrodes 138.

Similarly to the touch IC 300 applied to the display device of FIG. 2, the touch IC 300 applied to the display device of FIG. 3 may analyze the sensing signals received from the touch panel 130 to determine whether there is a normal touch. When there is the normal touch, the touch IC 300 may analyze touch coordinates of a touch region defined by the sensing signals, and transfer the touch coordinates to the touch use unit 500. When there is an abnormal touch, the touch IC 300 performs an operation of receiving the sensing signals without performing an operation of analyzing touch coordinates. A function of the touch IC 300 may be performed, particularly, in the sensors 330.

Moreover, the touch electrodes applied to the display device of FIG. 2 are divided into the driving electrodes 131 and the receiving electrodes 132, but the touch electrodes 138 applied to the display device of FIG. 3 are all configured as the same electrodes.

The display device according to the present invention may be configured with various types of touch panels 130 as described above. Therefore, a plurality of touch electrodes to be described below may be the driving electrodes 131 and receiving electrodes 132 of FIG. 2, or may be the touch electrodes 138 of FIG. 3. Also, for convenience of description, a region in which the driving electrode and the receiving electrode intersect each other may be defined as a touch electrode in a mutual type touch panel.

Figure 4:
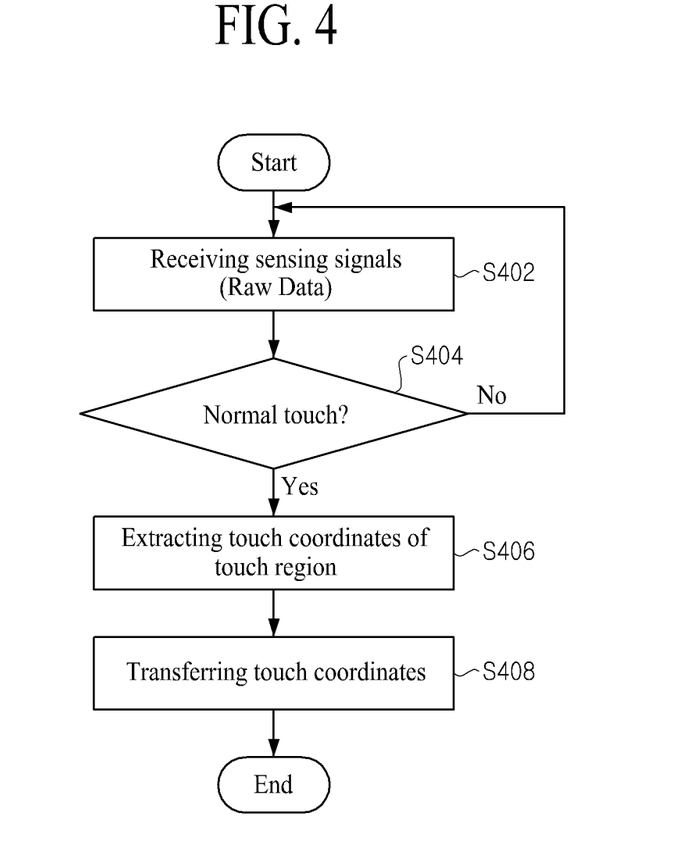
FIG. 4 is a flowchart for describing a method of driving a display device according to an embodiment of the present invention.
Figure 5:
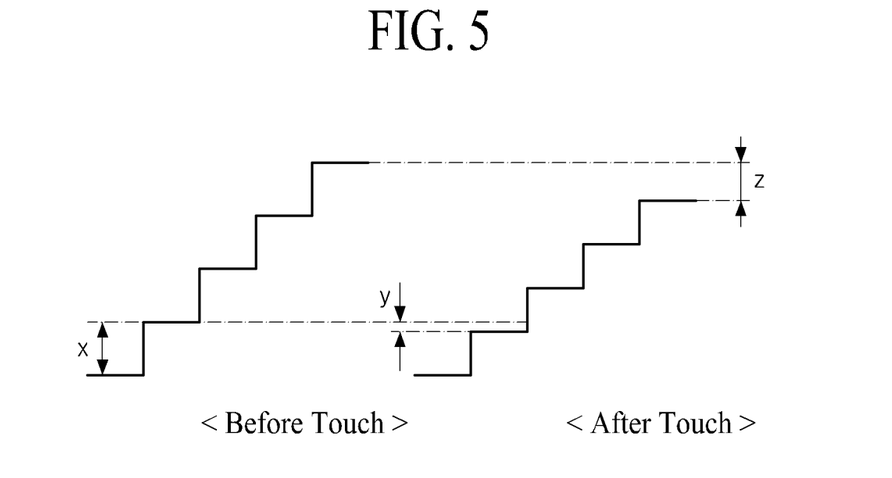
FIG. 5 is an exemplary diagram for describing a method of extracting a touch region in a mutual type display device according to the present invention.
Figure 6:
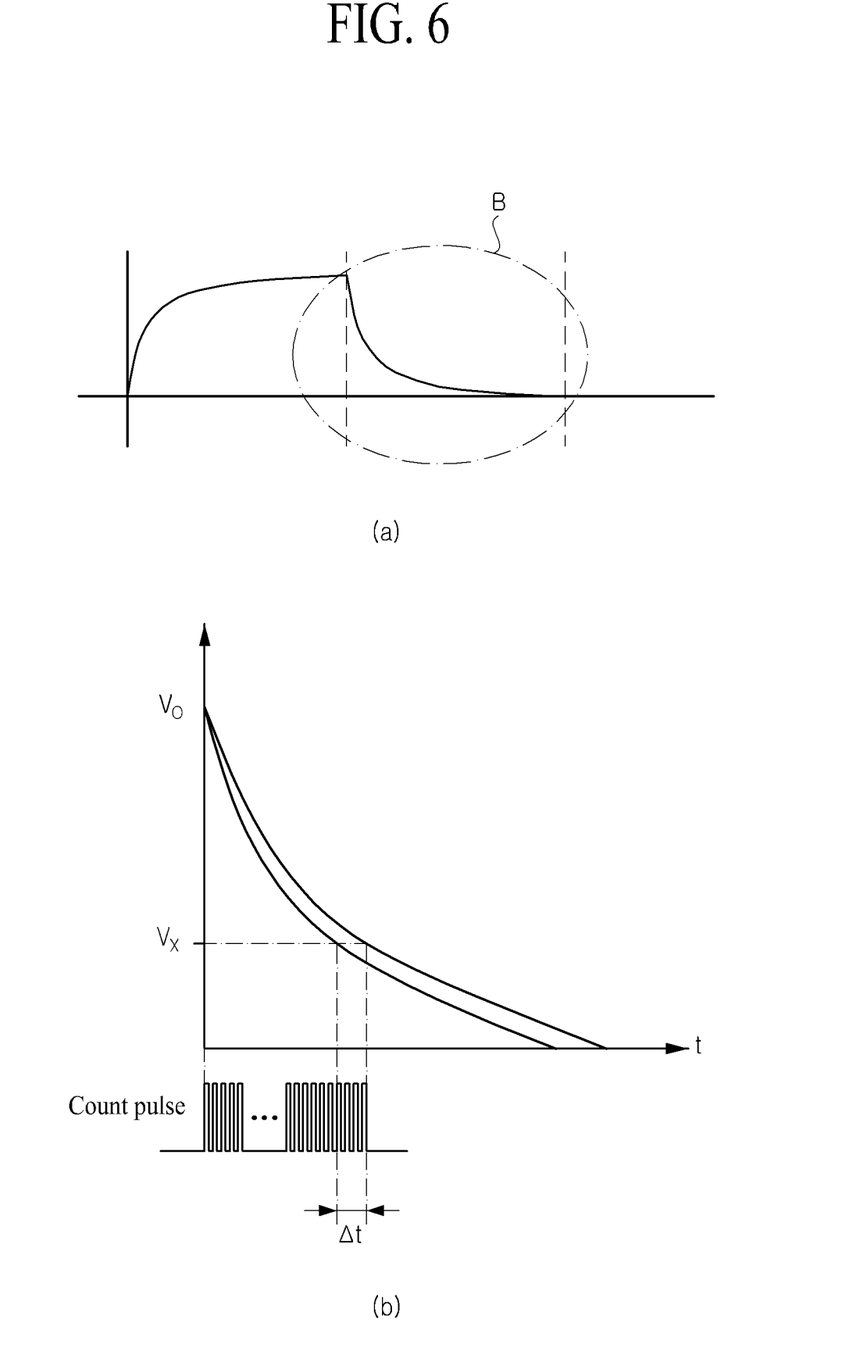
FIG. 6 is exemplary diagrams for describing a method of detecting a touch region in a self-capacitive type display device according to the present invention.
Figure 7:
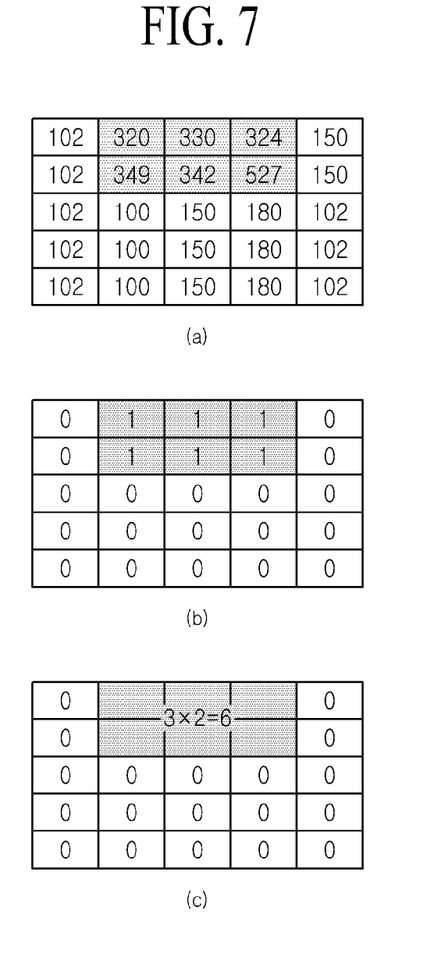
FIG. 7 is exemplary diagrams for describing a method of determining a normal touch in a method of driving a display device according to the present invention.
Figure 8:
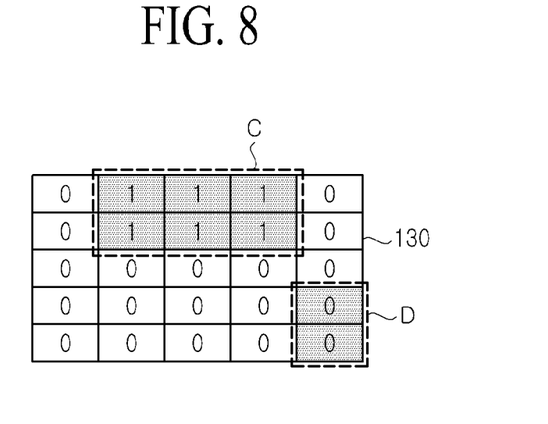
FIG. 8 is an exemplary diagram for describing a case in which a touch region determined as an abnormal touch and a touch region determined as a normal touch are all detected in a method of driving a display device according to the present invention.

FIG. 4 is a flowchart for describing a method of driving a display device according to an embodiment of the present invention. FIG. 5 is an exemplary diagram for describing a method of extracting a touch region in a mutual type display device according to the present invention. FIG. 6 is exemplary diagrams for describing a method of detecting a touch region in a self-capacitive type display device according to the present invention. FIG. 7 is exemplary diagrams for describing a method of determining a normal touch in a method of driving a display device according to the present invention. FIG. 8 is an exemplary diagram for describing a case in which a touch region determined as an abnormal touch and a touch region determined as a normal touch are all detected in a method of driving a display device according to the present invention.

A method of driving a display device according to the present invention is applied to the display device described above with reference to FIGS. 2 and 3, and is executed in the touch IC 300. Especially, in the display device of FIG. 2, the method of driving the display device according to the present invention may be executed by the receiver 320, and in the display device of FIG. 3, the method of driving the display device according to the present invention may be executed by the sensors 330. Hereinafter, for convenience of description, the method of driving the display device according to the present invention will be described as being executed by the touch IC 300.

The method of driving the display device according to the present invention may be divided into four operations as follows.

The method of driving the display device according to the present invention includes: first operation S402 in which the touch IC 300 receives a plurality of sensing signals from the touch electrodes 131 and 132 or 138 (hereinafter the same) of the touch panel 130; second operation S404 that analyzes the received sensing signals to determine whether there is a normal touch; third operation S402 and S406 that performs operation S406 of extracting touch coordinates of a touch region defined by the sensing signals when it is determined that there is the normal touch, and performs operation S402 of receiving the sensing signals without performing the operation of extracting the touch coordinates when it is determined that there is an abnormal touch; and fourth operation S408 that transfers the touch coordinates, which are extracted through the operation of extracting the touch coordinates for the normal touch, to the touch use unit 400.

In first operation S402, the touch IC 300 receives the sensing signals. A method of receiving the sensing signals may be various implemented depending on a structure of the touch panel 130.

First, in display device of FIG. 2, during a touch sensing period, an output unit 310 supplies the driving pulse (a driving voltage) to the driving electrodes 131.

Since the driving electrode 131 and the receiving electrode 132 intersect each other in the touch panel 130, a sensing signal is induced to the receiving electrodes 132 due to the driving pulse supplied to the driving electrodes 131, and is input to the receiver 320.

In the display device of FIG. 3, during the touch sensing period, the driving pulse supplied from the sensor 330 to the touch electrode 138 is again transferred to the sensor 330. Here, a signal which is again transferred to the sensor 330 due to the driving pulse is the sensing signal.

That is, in the mutual type touch panel 130 of FIG. 2, the driving pulse output from the driving electrode 131 is input to the receiver 320 via the receiving electrode 132, and a signal input to the receiver 320 is the sensing signal.

In the self-capacitive type touch panel 130 of FIG. 3, the driving pulse output from the driving electrode 131 to the touch electrode 138 is input to the sensor 330 via the touch electrode 138, and a signal input to the sensor 330 is the sensing signal.

In second operations S404, the touch IC 300 analyzes the received sensing signals to determine whether there is the normal touch.

In the operation of determining whether there is the normal touch, the touch IC 300 determines whether there is the normal touch, by using a size of a touch region defined by the sensing signals.

Here, the touch region may be formed by adjacent touch electrodes. For example, in FIG. 8, when a large tetragonal block denotes the touch panel 130 and a plurality of small tetragonal blocks are touch electrodes having one touch coordinates, the touch region may be a region D which is composed of two touch electrodes, or may be a region C which is composed of six touch electrodes. However, the touch region may be composed of one touch electrode.

That is, the term "touch region" used herein may denote a region which is formed by one touch electrode in which a touch occurs, but when a touch occurs in a plurality of touch electrodes, the term "touch region" may denote a region which is formed by adjacent touch electrodes.

Therefore, FIG. 8 illustrates a case in which two touch regions C and D are formed, and FIG. 7 illustrates a case in which one touch region is formed.

Operation S404 of determining whether there is the normal touch may include: an operation that calculates the size of the touch region defined by the sensing signals by using the sensing signals; an operation that determines there to be the normal touch when the size of the touch region is within a predetermined range; and an operation that determines there to be an abnormal touch when the size of the touch region is not within the predetermined range.

The operation of calculating the size of the touch region may include: an operation that binarizes the sensing signals with predetermined correction data to generate binarization data; and an operation of adds the binarization data to calculate the size of the touch region.

In order to calculate the size of the touch region defined by the sensing signals, whether there is a touch should be determined by the sensing signals. That is, only when whether each of the touch electrodes is touched is determined, a size of a touch region in which a touch occurs may be calculated.

In a first method, when applying the mutual type touch panel 130 of FIG. 2, the touch IC 300 may determine whether there is a touch, by using a method which is as illustrated in FIG. 5.

That is, as described above, the output unit 310 sequentially outputs the driving pulse to the driving electrodes 131 during the touch sensing period. At this time, one or more driving pulses are output to one driving electrode 131.

For example, FIG. 5 shows the changes in a charging amount due to a mutual capacitance applied across the receiving electrode 132 and the driving electrode 131 when four driving pulses are input one driving electrode 131.

That is, it can be seen that a total of charging amount based on the four driving pulses when there is no touch (before a touch) differs from a total of charging amount based on the four driving pulses when there is a touch (before the touch). That is, a difference equal to a certain value "z" may occur between the total of charging amount when there is no touch and the total of charging amount when there is the touch. In FIG. 5, x denotes a charging amount which is charged by one driving pulse when there is no touch, and y denotes a charging amount which is charged by the one driving pulse when there is the touch.

Therefore, the touch IC 300 may determine whether a touch occurs in an intersection region of a corresponding driving electrode and a corresponding receiving electrode, by using the change in the charging amount. In this case, the intersection region of the corresponding driving electrode and the corresponding receiving electrode is a region composing one touch coordinates. Thus, as described above, the intersection region of the corresponding driving electrode and the corresponding receiving electrode may be a touch electrode in the mutual type touch panel 130.

In a second method, when applying the self-capacitive type touch panel 130 of FIG. 3, the touch IC 300 may determine whether there is a touch, by using a method which is as illustrated in FIG. 6.

That is, in the self-capacitive type, determining whether there is a touch uses a charging or discharging of the driving pulse which is as shown in FIG. 6(a). To provide an additional description, the self-capacitive type touch panel 130 senses a touch by using a voltage slope change caused by a change in a capacitance value when the touch panel 130 is touched and when the touch panel 130 is not touched.

For example, a graph of FIG. 6(b) is to enlarge a latter portion B of the driving pulse of FIG. 6(a), and shows a case which uses discharging.

In this case, the touch IC 300 using the self-capacitive type may sense a time difference, for which a sensing signal generated from the driving pulse is reduced from the maximum value $V_O$ to a value $V_X$ (a reference voltage or a sensing voltage), to determine whether there is a touch.

That is, when the self-capacitive type touch panel 130 is touched with a finger or the like, a sensing time from the maximum value $V_O$ to the reference voltage $V_X$ of a sensing signal is increased by a capacitance (Cf) of the finger, and thus, a time difference Δt occurs between the sensing time when the touch panel 130 is touched and a reference time from the maximum value $V_O$ to the sensing voltage $V_X$ of a sensing signal when the touch panel 130 is not touched. In this case, the touch IC 300 determines the touch panel 130 as being touched when the time difference is not within a certain range.

On the above-described principle, as illustrated in FIG. 7(a), information about a sensed charging change amount or a time difference is stored for each touch electrode. As described above with reference to FIG. 8, a large tetragonal block of FIG. 7 denotes the touch panel 130, and small tetragonal blocks of FIG. 7 denote a touch electrode having one touch coordinates.

Therefore, the touch panel 130 of FIG. 7 includes a total of twenty-five touch electrodes or touch coordinates. In this case, FIG. 7(a) illustrates information about a charging change amount or a time difference, which is extracted on the above-described principle, for each touch electrode or touch coordinates. Here, the information about the charging change amount or the time difference may be referred to as raw data.

The touch IC 300 binarizes the sensing signals, which are as illustrated in FIG. 7(a), with the predetermined correction data to generate binarization data which are as illustrated in FIG. 7b).

For example, when a charging change amount in each touch electrode is as illustrated in FIG. 7(a), the touch IC 300 determines there to be a touch when the charging change amount exceeds 300, and thus, as illustrated in FIG. 7(b), the touch IC 300 expresses values of corresponding touch electrodes as 1, and expresses values of the other touch electrodes as 0.

As another example, when a time difference in each touch electrode is as illustrated in FIG. 7(a), the touch IC 300 determines there to be a touch when the time difference exceeds 300, and thus, as illustrated in FIG. 7(b), the touch IC 300 expresses values of corresponding touch electrodes as 1, and expresses values of the other touch electrodes as 0.

Subsequently, the touch IC 300 adds values of 1 indicating the touch to calculate a size of a touch region.

That is, as illustrated in FIG. 7(b), when there are six touch electrodes having a value of 1, a size of a touch region in a corresponding touch panel may be determined as 6 as illustrated in FIG. 7(c).

Finally, when the size of the touch region is within a predetermined range, the touch IC 300 determines there to be a normal touch, and when the size of the touch region is not within the predetermined range, the touch IC 300 determines there to be an abnormal touch.

For example, as illustrated in FIG. 8, when a size of a touch region C is determined as 6, the touch region C may be determined as being formed by an abnormal touch, and when a size of a touch region D is determined as 2, the touch region D may be determined as being formed by a normal touch.

Here, the size of the touch region for determining whether there is a touch may be variously set according to a size of a touch panel and the number of touch electrodes.

As another example, the touch panel 130 of FIG. 7 or FIG. 8 is configured with 200 or more touch electrodes, and when the size of the touch region is 0, it is determined that there is no touch. Also, when the size of the touch region is 1 to 99, it is determined that there is a normal touch, and when the size of the touch region is 200 or more, it is determined that there is an abnormal touch.

In third operation S402 and S406, when it is determined in operation S404 that there is the normal touch, the touch IC 300 performs operation S406 of extracting the touch coordinates of the touch region defined by the sensing signals, and when it is determined that there is the abnormal touch, the touch IC 300 performs operation S402 of receiving the sensing signals without performing operation S406 of extracting the touch coordinates.

That is, when the size of the touch region is a large size enabling the normal touch to be determined, or when the size of the touch region is a very small size able to be determined as not being touched, the touch IC 300 repeats operation S402 of receiving the sensing signals without performing the other operations.

Accordingly, the touch IC 300 does not perform an unnecessary operation, and thus, an operation speed of the touch IC 300 can become higher.

However, when the size of the touch region is determined as the normal touch, the touch IC 300 normally performs operation S406 of extracting the touch coordinates of the touch region to extract the touch coordinates, and transfers the extracted touch coordinates to the touch use unit 500 in operation S408.

When it is determined in operation S404 that there are the abnormal touch, the touch IC 300 does not perform operation S406 of extracting the touch coordinates, and moreover, after a predetermined time elapses, the touch IC 300 performs operation S402 of receiving the sensing signals.

That is, the abnormal touch can momentarily occur, or can continuously occur for a certain period. In this case, unnecessary touch sensing can be continuously performed, and due to this, the touch IC 300 may not perform an operation of determining whether there is a touch for a certain period, for example, during twenty frames.

In this case, by outputting the driving pulse, the touch IC 300 may not perform operation S402 itself of receiving the sensing signals, or despite the sensing signals being received, the touch IC 300 may not perform operation S404 of determining whether there is the normal touch.

However, even when the abnormal touch occurs, it is not considered that the abnormal touch is continued for a certain period.

The above-described touch non-sensing period may be variously set according to the use and feature of an electronic device that includes the display device according to the present invention, or may not be set.

Moreover, the abnormal touch can occur simultaneously with the normal touch.

For example, FIG. 8 illustrates a case in which two touch regions are formed. In this case, as described above, a touch having a size of six touch regions may be determined as the abnormal touch, but a touch having a size of two touch regions may be determined as the normal touch.

Therefore, when it is determined in operation S404 that the touch region C determined as the abnormal touch and the touch region D determined as the normal touch are all detected, the touch IC 300 may perform operation S406 of extracting the touch coordinates for the touch region D determined as the normal touch, and perform operation S402 of receiving the sensing signals without performing operation S406 of analyzing the touch coordinates, for the touch region C determined as the abnormal touch.

In this case, the touch non-sensing period may be variously set depending on an application state of the display device.

In fourth operation S408, the touch coordinates which are extracted through the operation of extracting the touch coordinates for the normal touch are transferred to the touch use unit 500.

When a specific menu is output for the touch coordinates, the touch use unit 500 may determine the specific menu as being selected by the touch, and perform a function mapped to the specific menu.

In addition, the touch use unit 500 may perform various functions corresponding to the touch coordinates.

As described above, the present invention analyzes a size of a touch region to determine whether a touch is normal or abnormal, and only when the touch region is a normal touch region, by performing an operation of analyzing touch coordinates, the present invention can prevent a time from being unnecessarily consumed for processing of an abnormal touch. Accordingly, a touch sensing time can be shortened.

Moreover, by not extracting touch coordinates for an abnormal touch, the present invention can prevent a malfunction of the touch IC and the touch use unit due to the abnormal touch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of driving a display device, the method comprising:
   respectively receiving a plurality of sensing signals from a plurality of touch electrodes formed at a touch panel;
   determining whether there is a normal touch, by using a number of the plurality of touch electrodes where there is a touch in a touch region defined by the received sensing signals, among the plurality of touch electrodes; and
   when it is determined that there is the normal touch, performing an operation of extracting touch coordinates of the touch region, and when it is determined that there is an abnormal touch, performing an operation of receiving the sensing signals without performing the operation of extracting the touch coordinates,
   wherein the determining of whether there is a normal touch comprises:
   calculating a size of the touch region defined by the sensing signals by using the number of the plurality of touch electrodes where there is a touch;
   when the size of the touch region is within a predetermined range, determining there to be the normal touch; and
   when the size of the touch region is not within the predetermined range, determining there to be the abnormal touch.

2. The method of claim 1, wherein the touch region is formed by adjacent touch electrodes.

3. The method of claim 1, wherein the calculating of the size comprises:
   binarizing the sensing signals with predetermined correction data to generate binarization data; and
   adding the binarization data to calculate the number of the plurality of touch electrodes where there is a touch to calculate the size of the touch region.

4. The method of claim 1, wherein in the performing of an operation of receiving the sensing signals without the operation of extracting the touch coordinates,
   when it is determined that there is the abnormal touch, the operation of extracting the touch coordinates is not performed, and after a predetermined time elapses, the operation of receiving the sensing signals is performed.

5. The method of claim 1, further comprising, when it is determined that a touch region determined as the abnormal touch and a touch region determined as the normal touch are all detected, performing an operation of extracting touch coordinates for the touch region determined as the normal touch, and performing the operation of receiving the sensing signals without performing the operation of extracting the touch coordinates, for the touch region determined as the abnormal touch.

6. A display device comprising:
   a panel in which a plurality of pixels are respectively formed in a plurality of areas defined by intersections between a plurality of gate lines and a plurality of data lines;
   a touch panel in which a plurality of touch electrodes are formed;
   a driver configured to drive the panel; and
   a touch IC configured to analyze sensing signals received from the touch panel to determine whether there is a normal touch, by using a number of the plurality of touch electrodes where there is a touch among the plurality of touch electrodes, and when it is determined that there is the normal touch, perform an operation of extracting touch coordinates of a touch region defined by the sensing signals, or when it is determined that there is an abnormal touch, perform an operation of receiving the sensing signals without performing the operation of extracting the touch coordinates,
   wherein the touch IC determines whether there is the normal touch by using a size of the touch region defined by the sensing signals, the size of the touch region being calculated by the number of the touch electrode where there is a touch.

7. The display device of claim 6, wherein,
   the touch IC calculates a size of the touch region defined by the sensing signals by using the number of the plurality of touch electrodes where there is a touch among the plurality of touch electrodes,
   when the size of the touch region is within a predetermined range, the touch IC determines there to be the normal touch, and
   when the size of the touch region is not within the predetermined range, the touch IC determines there to be the abnormal touch.

* * * * *